United States Patent [19]

Clark et al.

[11] Patent Number: 4,929,014

[45] Date of Patent: May 29, 1990

[54] FULL WINDSHIELD SUNSHADE

[75] Inventors: Robert J. Clark; Patrick W. Binish, both of Holland, Mich.

[73] Assignee: Prince, Holland, Mich.

[21] Appl. No.: 290,703

[22] Filed: Dec. 27, 1988

[51] Int. Cl.⁵ .............................................. B60J 3/02
[52] U.S. Cl. .................................. 296/97.8; 160/370.2
[58] Field of Search .......................... 296/97.8, 140; 160/370.2, 32, 36, 202, 197

[56] References Cited

U.S. PATENT DOCUMENTS

| | | | |
|---|---|---|---|
| 2,289,644 | 4/1941 | Gano | 296/97.8 |
| 2,339,240 | 4/1941 | Magness | 296/97.8 |
| 2,829,003 | 4/1956 | Moyes | 296/97.8 |
| 3,003,812 | 10/1961 | Haugland | 296/97.8 |
| 3,021,173 | 2/1962 | Levin | 296/97.8 |
| 3,201,170 | 8/1965 | Weingarten | 296/97.8 |
| 4,149,749 | 4/1979 | Canal | 296/97.8 |
| 4,363,513 | 12/1982 | Sahar | 296/140 |
| 4,468,062 | 8/1984 | Marcus | 296/97.8 |
| 4,491,360 | 1/1985 | Fleming | 296/97.8 |
| 4,492,404 | 1/1985 | Marcus | 296/97.4 |
| 4,558,899 | 12/1985 | Chu | 296/97.8 |
| 4,647,102 | 3/1987 | Ebrahimzadeh | 296/97.8 |
| 4,671,334 | 6/1987 | Yadegar | 160/84 R |
| 4,671,558 | 6/1987 | Cline | 296/97.1 |
| 4,674,789 | 6/1987 | Watjer | 296/97.1 |

Primary Examiner—Robert R. Song
Attorney, Agent, or Firm—Price et al.

[57] ABSTRACT

A visor includes several overlapping sliding panels mounted to a vehicle roof by support arms which together with the panels retract within a slot in the vehicle headliner for storage. The visor can be extended as desired from the headliner to provide selected or full window coverage.

30 Claims, 4 Drawing Sheets

FULL WINDSHIELD SUNSHADE

BACKGROUND OF THE INVENTION

The present invention pertains to a vehicle sunshade and particularly one for selectable use in blocking parts or the entire windshield of the vehicle.

There exists a wide variety of vehicle sunshades which are adapted to cover the entire windshield of a vehicle such as when it is parked incident sunlight through the windshield is blocked, and the resultant interior heating of the vehicle is reduced. One such system is disclosed in U.S. Pat. Nos. 4,363,513; 4,647,102; and 4,671,558. A variety of sliding visors which extend from the headliner of the vehicle are also well known. Such visors are represented by, for example, U.S. Pat. Nos. 4,419,749; 4,674,789; 4,492,404; 4,491,360; and 4,468,062.

The difficulty with the flexible cover type windshield covers is that they tend to be difficult to handle inasmuch as the flexible material tends to bunch up and become entangled if it is attempted to raise or lower the flexible material to and from a storage area. Thus, flexible material including pleated-type material typically requires additional unsightly storage areas such as relatively large housings to accommodate their bulk when stored. Solid-type visors, on the other hand, which are stored in the vehicle headliner, typically are single piece, far too small for full window coverage. Even if a large single piece panel could fit in a headliner, it would be ungainly to handle and due to the curvature of the windshield could not provide complete sun blocking protection. Naturally, there exists fiber board full windshield protectors which are common as promotional items, however, they are made to be stored in the rear seat or trunk of the vehicle when not in use and are only temporary devices.

Thus, there exists a need for a visor system which is a permanent installation as part of the vehicle which provides storage in the vehicle headliner so as to be unnoticeable and thereby promote and allow a clean and neat appearing interior of the vehicle and yet provide full window protection and preferably also function as a visor for partial windshield protection for blocking sun during driving as well as parking of the vehicle.

SUMMARY OF THE PRESENT INVENTION

The system of the prevent invention combines the desirable attributes of a full windshield cover made of a solid material together with the smaller retractable visor-only panels by employing a unique overlapping multiple panel collapsible visor with panels made of a relatively thin flexible material and guidably interlocked with adjacent panels for selective extension from a headliner of a vehicle to lowered use positions including full windshield protection. In a preferred embodiment of the invention, a pair of pivoted side panels are progressively pivoted outwardly as the visor is extended from the stored position to fill in the triangular corner areas adjacent the A-pillars of a vehicle to provide full windshield protection. Suitable guide and support means are mounted between the vehicle headliner and support roof to provide guide and support for the multiple panels as well as side panels to provide positive control between the stored retracted position in which the visor is substantially hidden to selected use positions extended from the headliner.

These and other features objects and advantages of the present invention will become apparent upon reading the following description thereof together with reference to the accompanying drawings in which:

DETAILED DESCRIPTION OF THE PREFERRED EMBODIMENT

Figure 1:
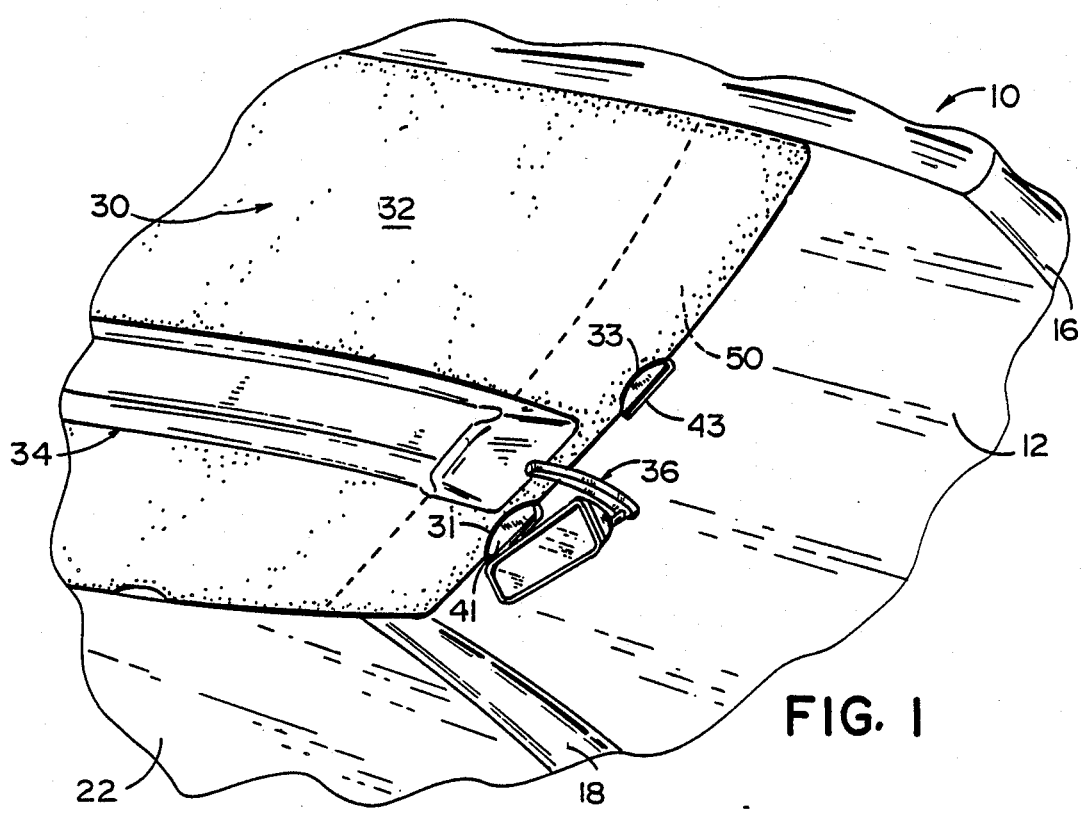
FIG. 1 is a fragmentary perspective view of an interior of a vehicle showing the visor system of the present invention in a fully retracted stored position.

Referring initially to FIGS. 1–4, there is shown a vehicle 10 such as an automobile having a windshield 12 extending downwardly from the front edge of the sheet metal roof 14 (FIG. 4) of the vehicle and between the tapered A-pillars 16 and 18 on either side. A right side window 20 and a left side window 22 are also shown. With relatively modern day vehicles, as can be seen in the figures, the windshield 12 is generally curvilinear and trapezoidal in shape including a dimension at its lower edge 13 (FIG. 4) which is significantly longer than the dimension along its top edge 11 thereby providing triangular corners adjacent the A-pillars 16 and 18.

Figure 2:
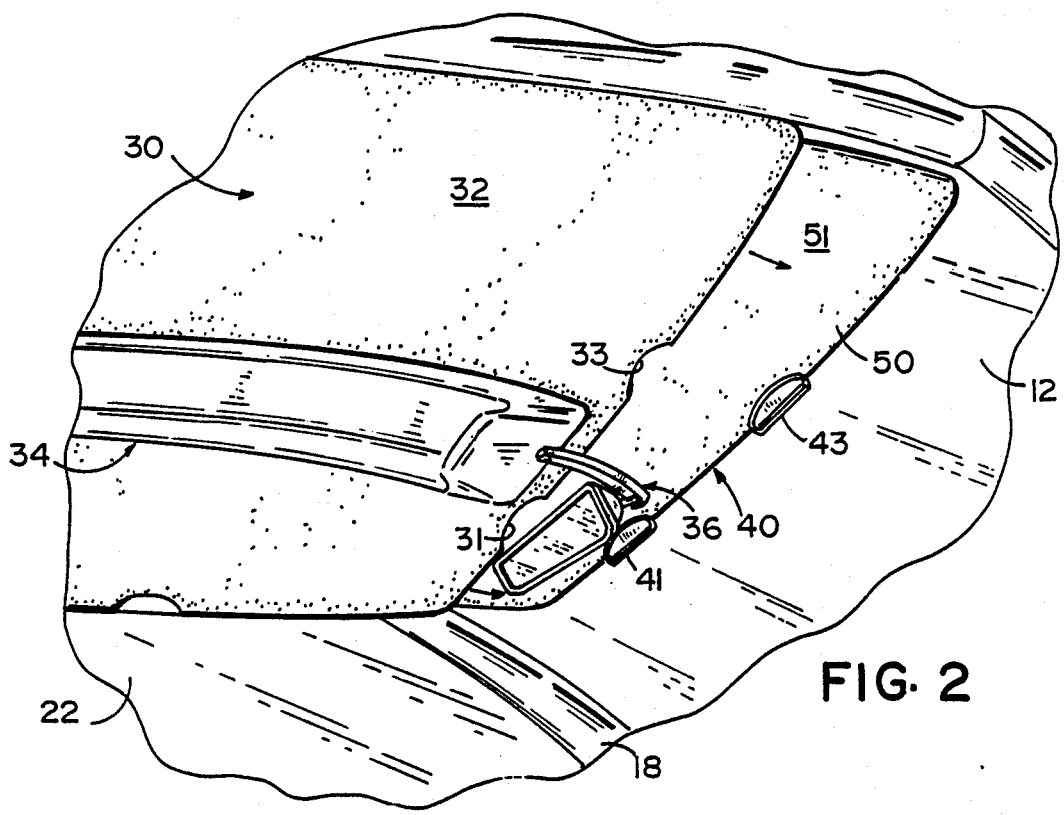
FIG. 2 is a fragmentary perspective view of an interior of a vehicle showing the visor system of the present invention partially extended for normal use in driving.
Figure 3:
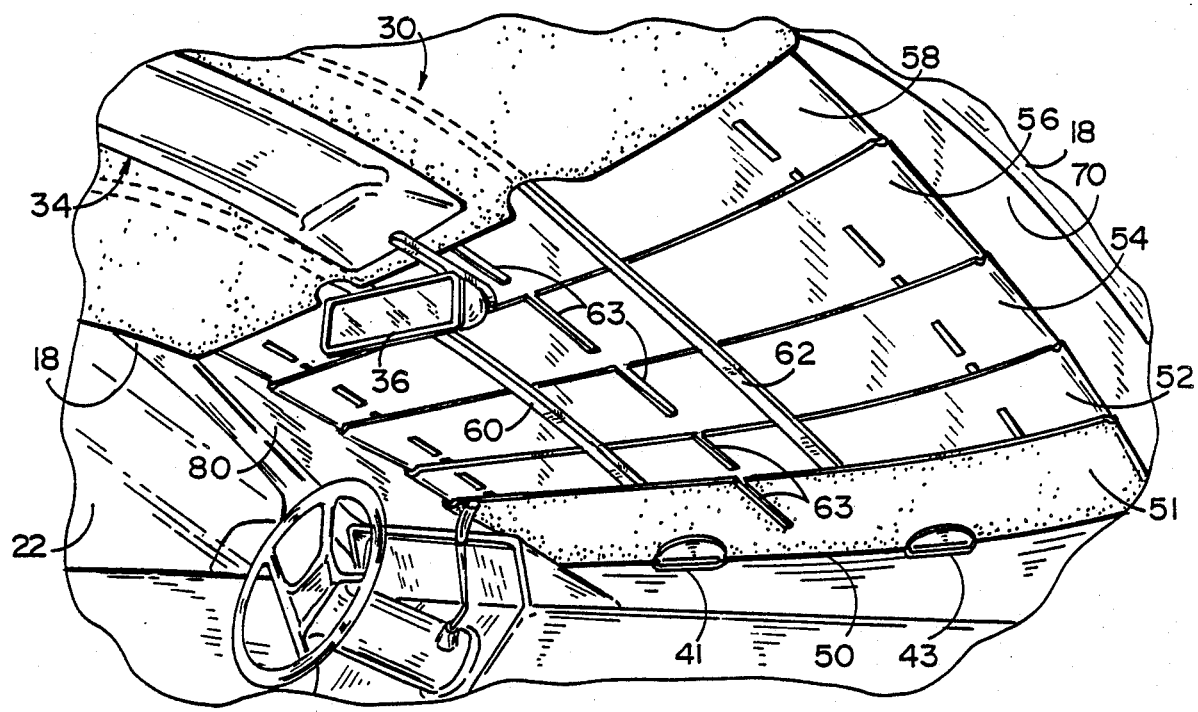
FIG. 3 is a fragmentary perspective view of an interior of a vehicle showing the visor system of the present invention fully extended to totally enclose a vehicle's windshield.

Within the vehicle, there is mounted a headliner assembly 30 which, typically, is made of a preformed material which can be covered with a suitable upholstery material 32 on its exterior downwardly facing surface and to which there may be attached a variety of accessories such as a vehicle console 34 and a rearview mirror assembly 36 as best seen in FIGS. 1-3. The material for the preformed headliner 30 can be any of a variety of conventionally used materials such as compression molded fibrous materials. The headliner assembly 30 includes, as described in greater detail below, prior to assembly into the vehicle the visor system 40 of the present invention. The headliner 30 is attached to suitable support structure within the roof 14 of the vehicle by conventional fasteners such as snap-in type devices. The forward edge of the headliner includes a pair of recesses 31 and 33 which nestably receive handles 41 and 43 of the visor assembly 40 which is unobtrusively stored as seen in FIG. 1 above and between the headliner 30 and vehicle roof 14. The visor assembly 40 and its operation will be briefly described in connection with FIGS. 2-4 followed by a detailed description of the structure.

Figure 4:
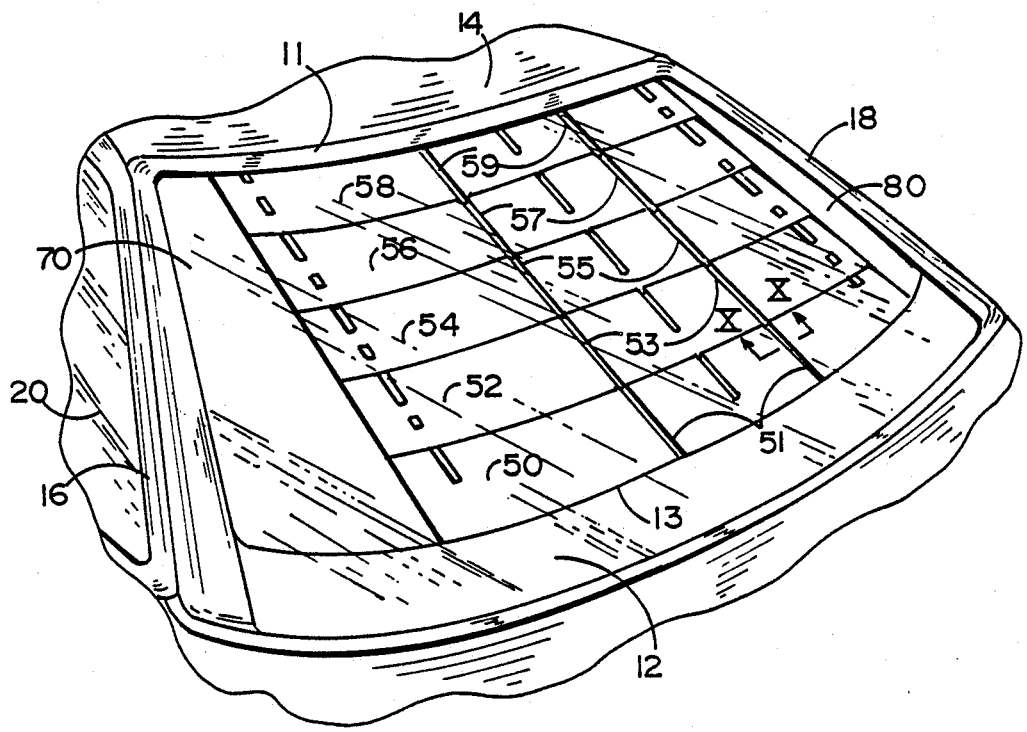
FIG. 4 is a fragmentary perspective view of the exterior of a vehicle showing the sunvisor of the present invention fully extended as seen also in FIG. 3.
Figure 5:
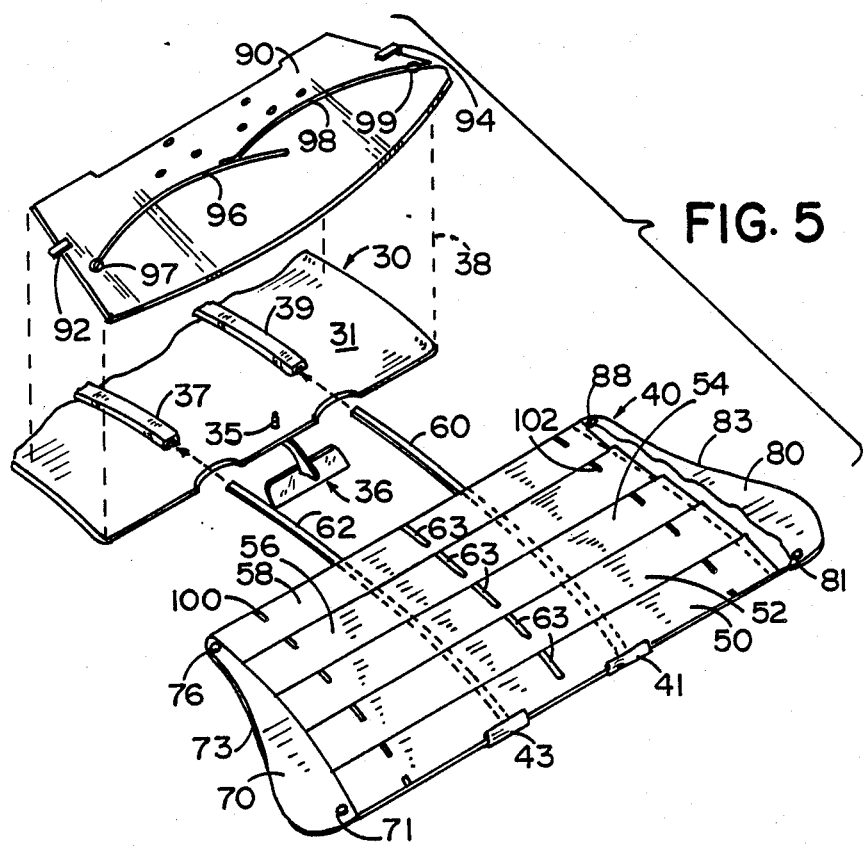
FIG. 5 is a fragmentary perspective exploded view of the visor system of the present invention.
Figure 6:
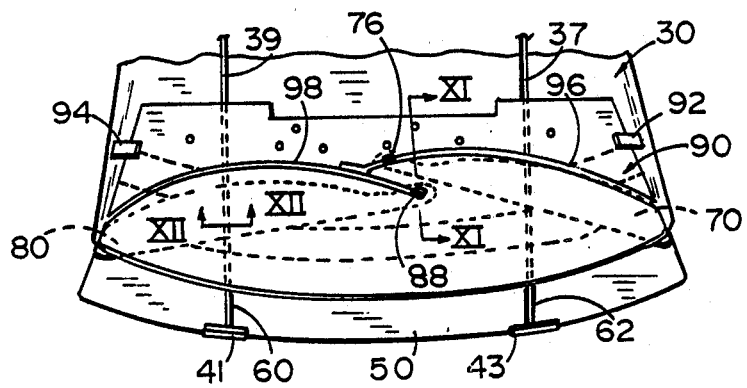
FIG. 6 is a fragmentary assembled view of the structure shown in FIG. 5.

The visor assembly 40 includes a plurality of generally horizontally extending elongated rectangular panels 50, 52, 54, 56 and 58 which are nested in overlapping relationship when stored as shown in FIGS. 1 and 6 and can be extended to fully cover the windshield as illustrated in FIGS. 3 and 4. The first panel 50 includes the spaced handles 41 and 43 for the extension of the visor assembly 40 and differs from the remaining panels 52-58 in that it may be covered by a suitable upholstery material 51 on its lower surface to conform the appearance of the lead panel 50 to the headliner upholstery 32. Thus, when the visor assembly 40 is partially withdrawn from the vehicle as illustrated in FIG. 2 with only panel 50 exposed, it provides a visor for use during operation of the vehicle having an appearance which conforms to that of the vehicle headliner. Attached to the rear edge of forward panel 50 is a pair of spaced rearwardly extending parallel flexible generally thin rectangular guide arms 60 and 62 which are guidably received by channel means 37 and 39 (FIGS. 5 and 6) in the headliner as described below. The panels 50-58 are interconnected by a suitable guide and support means as also described below to permit their extension and nested contraction for storage between the positions shown in FIG. 1 and that shown in FIG. 3. Also coupled to the first panel 50 are a pair of side panels 70 and 80 which as described in connection with FIGS. 5-10 below pivot outwardly and are positively controlled to gradually pivot outwardly to fill in the triangular corners of the windshield as illustrated in FIGS. 3 and 4 to provide complete windshield coverage. Thus, the visor system 40 of the present invention provides a storable visor system which integrates into the headliner of the vehicle as shown in FIG. 1 and provides selected use positions such as illustrated in FIG. 2. The visor can be extended to cover only the upper portion of the windshield or be selectively lowered from the position shown in FIG. 2 to other lowered use positions including a full windshield coverage position as illustrated in FIGS. 3 and 4.

Figures 11, 12:
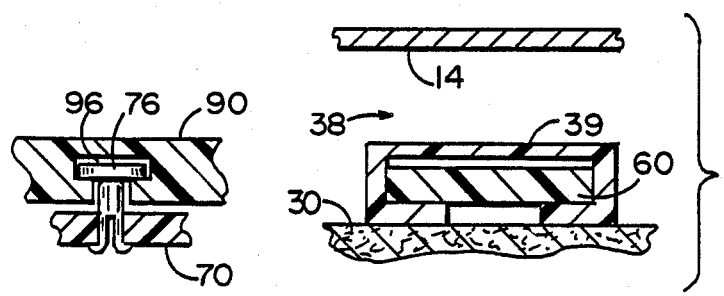
FIG. 11 is an enlarged fragmentary cross-sectional view taken along section line XI—XI of FIG. 6.
FIG. 12 is an enlarged fragmentary cross-sectional view taken along section line XII—XII of FIG. 6.

Referring now to FIG. 5, the visor assembly 40 and its interrelationship to the remaining parts of the vehicle can best be seen. The visor system includes a guide and support plate 90 which is secured to the vehicle roof 14 by suitable mounting flanges 92 and 94. Member 90 has formed therein a pair of generally laterally extending arcuate T-shaped slots 96 and 98 which open downwardly and slidably and guidably receive T-shaped guide posts 76 and 88 associated with side panels or wings 70 and 80 respectively as illustrated in FIG. 11. As will be described in greater detail below, the shallow arcuate slots 96 and 98 guide the pivoting action of side panels or wings 70 and 80 as the visor assembly 40 is withdrawn from the storage slot 38 (FIG. 12) at the forward edge of the headliner 30 between the headliner and the roof of the vehicle from an overlapped stored position as illustrated in FIG. 6 to the extended position shown in FIG. 5.

Covering the guide plate 90 and roof 14 of the vehicle is the headliner 30 which is mounted in spaced relationship below the roof 14 and plate 90 leaving a slot or gap 38 (FIGS. 5 and 11) at the forward edge of the headliner for receiving visor 40. The upper surface 31 (FIG. 5) of the headliner includes a pair of parallel spaced guide channels 37 and 39 attached thereto for receiving guide arms 62 and 60 respectively which extend rearwardly from forward panel 50 as seen in FIG. 12. Channels 37 and 39, thus, guidably support the movement of visor assembly 40 with respect to the headliner 30.

Figure 10:
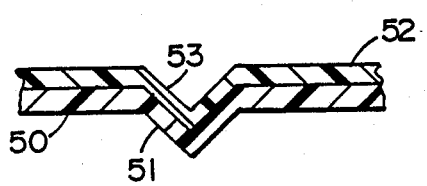
FIG. 10 is an enlarged fragmentary cross-sectional view taken along section line X—X of FIG. 4.
Figure 7:
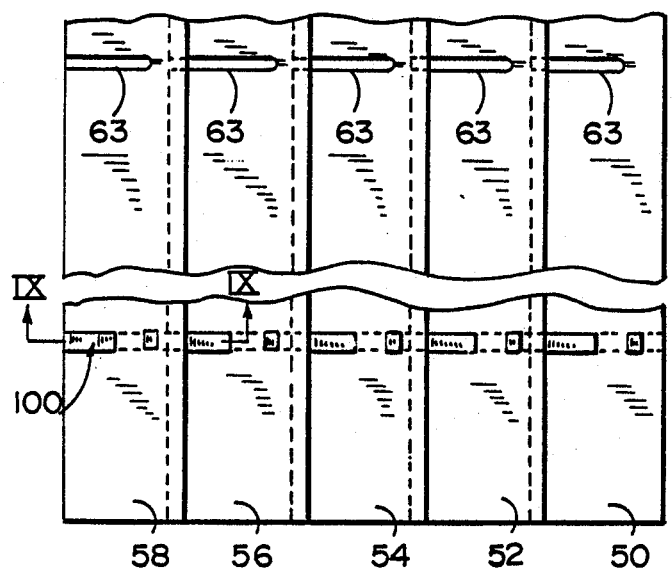
FIG. 7 is an enlarged fragmentary plan view, partly broken away, of a portion of the visor system of the present invention.
Figure 8:
FIG. 8 is a front edge elevational view of the structure shown in FIG. 7.
Figure 9:
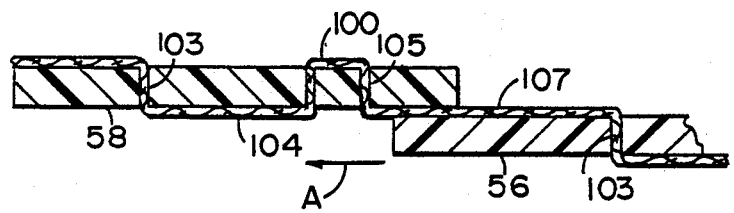
FIG. 9 is an enlarged fragmentary cross-sectional view taken along section line IX—IX of FIG. 7.

The construction of panels 50-58 is best seen in FIGS. 7-9 as well as in connection with FIG. 3 in which it is seen that the outer edges of each of the panels are concavely curved to define inter-fitting nested lips with panel 50 being on the inner side of the visor facing the vehicle interior and panels 52, 54, 56 and 58 overlapping progressively toward the windshield side of the visor. Each of the panels are made of a relatively thin carbon fiber sheet material having a thickness of approximately 0.060 inches to allow curvature of the visor 40 in a vertical direction and to some extent in a horizontal direction with respect to the curved windshield so that collectively they conform to the windshield as the visor is lowered. Similarly, guide arms 60 and 62 are made of a resilient polymeric material and are attached to forward panel 50 and flex to allow downward curvature of the visor with respect to the curved windshield. As best seen in FIG. 3, panels 50-58 are supported in part by the guide arms 60 and 62 and in effect rest in part upon the curved arms when the visor is lowered. In addition to the curved outer edges of nested panels 50-58, the panels include a pair of spaced V-shaped inter-fitting notches or troughs 51-59 in panels 50-58 respectively which provide lateral stability of the panels with respect to one another together with the nested curved ends. The V-shaped notches generally align with the guide tracks 60 and 62 and are hidden therebehind in FIG. 3 but are visible in FIG. 4. The detail of notches 51 and 53 is shown in FIG. 10. Each of the panels also includes a central rearwardly opening notch 63 for clearing the rearview mirror mounting fastener 35 (FIG. 5) as the visors move to the retracted position.

A pair of spaced ribbons 100 and 102 are interwoven between each of the panels 50-58 as best seen in FIG. 9 by means of slots 103, 104, and 105 in each of the panels such that the panels are successively extended from the stored position as the lead panel 50 is drawn outwardly. The ribbons 100 and 102 allow the collapsed nesting of the panels in a stacked overlapping relationship when stored as illustrated in FIG. 6 and by flexing rearwardly, as for example, when panel 56 moves rearwardly in a direction indicated by arrow A in FIG. 9 to underlie panel 58 with ribbon section 107 shown in FIG. 9 underlying panel 58. Similarly, the remaining segments of the nylon web-type ribbons will allow the nested stacking of panels 50-58 when in a retracted position. As panel 50 is drawn forwardly, however, the corresponding ribbon segment will, once panel 50 is withdrawn as shown in FIG. 2, begin pulling the successive panel 52 outwardly from the headliner storage area. Thus, the ribbon segments 100 and 102 provide for the successive pulling-out of the panel sections in a controlled fashion and collapsed to allow the retraction of the panels to the stored position.

Each of the side panels or wings 70 and 80 is pivotally mounted at their inward lower corner to the lower outer edge of panel 50 by means of suitable rivets 71 and 81 respectively to pivot about the corner of the panel. The outer edges 73 and 83 are tapered as best seen in FIG. 5 to conform to the curved and inclined shape of the windshield. Panels 70 and 80 move freely with respect to the remaining panel sections 52–58 but are captively held within arcuate guide slots 96 and 98 by the pins 76 and 88 respectively to move in an arcuate slot and pivot about point 71 and 81 as the visor 40 is extended and retracted from its storage position. The T-shaped guide posts 76 and 88 respectively are positioned within tracks 96 and 98 during assembly of the headliner and visor assembly 40 to the vehicle after the guide plate 90 is mounted to the vehicle by extending the T-shaped heads into enlarged openings 97 and 99 subsequently urging the T-shaped guides 76 and 78 respectively inwardly along the inverted T-shaped track such that they are captively held therein for normal positions of the visor assembly.

Panels 70 and 80 are positioned on the outer surface or windshield side of all of the panels 52–58 so as not to interfere with the nested collapsed relationship of the panels as they are extracted and withdrawn from the headliner. Panels 70 and 80, like the remaining panels, are also made of a relatively thin resilient carbon fiber material to provide sufficient stiffness such that the visor assembly is largely self-supporting and yet curves as it is fully extended and collapses into a compact storage area between the headliner and vehicle roof. As seen best by reference to FIG. 6, as handles 41 and 43 are pulled forwardly drawing panel 50 outwardly from the front edge of the headliner, guide pins 76 and 88 travel outwardly along tracks 96 and 98 to urge the panels 70 and 80 outwardly until the end of travel is reached and they are near the outer edge of the tracks but not to the enlarged openings 97 and 99 respectively.

Thus, it is seen with the system of the present invention there is provided a compact integrated visor system in which the visor can be partially or wholly withdrawn from the headliner storage area to provide partial or full windshield coverage utilizing stiffly resilient flexible relatively thin overlapping panels which nest for storage and which guidably interlock with one another to provide substantially full windshield coverage when fully extended. Pivoted side panels provide coverage for the triangular corners of the lower windshield areas on each side to complete the sun blocking function of the full windshield visor system.

It will become apparent to those skilled in the art that the various modifications to the preferred embodiment of the invention can be made without departing from the spirit or scope thereof as defined by the appended claims.

The embodiments of the invention in which an exclusive property or privilege is claimed are defined as follows:

1. A visor system for a vehicle comprising:
    a visor including a plurality of horizontally extending elongated generally rectangular panels arranged in sliding overlapping relationship to each other; and
    means for mounting said panels for movement between a stored substantially overlapped position adjacent a vehicle roof to extended positions covering a vehicle window, wherein said panels are interconnected by means of a pair of flexible spaced ribbons coupled to each panel.

2. The apparatus as defined in claim 1 wherein each of said panels include notch means extending in a direction generally orthogonal to the major axis of said panel and which nest within notch means of an adjacent panel to provide stability between said panels as they slide with respect to one another.

3. A curved visor system for full coverage of a vehicle windshield comprising:
    a segmented visor comprising sections of thin flexible material which substantially overlie one another in a compact stored position but which extend to substantially non-overlying relationship when extended; and
    a pair of flexible arms extendable from the vehicle roof in a fore and aft direction and in spaced relationship to the windshield for supporting said sections thereon.

4. The apparatus as defined in claim 3 wherein one of said sections is coupled to an end of said arms proximate extended. the lower edge of the windshield when said visor is 5. The apparatus as defined in claim 4 wherein said visor further includes a pair of side panels which are pivotally mounted to said one section to fill in the corners of the windshield when said visor is extended.

6. The apparatus as defined in claim 5 and further including flexible means interconnecting said sections.

7. A visor system for a vehicle window comprising:
    a visor including at least three relatively thin flexible generally horizontally extending panels mounted in sliding overlapping relationship to each other and means coupling said panels to each other for movement between a stored substantially overlapped position adjacent the vehicle roof to extended positions covering the vehicle window; and
    means for mounting said visor to a vehicle roof.

8. A visor system for a vehicle window comprising:
    a visor including a plurality of relatively thin generally horizontally extending panels mounted in sliding overlapping relationship to each other and means coupling said panels to each other for movement between a stored substantially overlapped position adjacent the vehicle roof to extended positions covering the vehicle window; and
    means for mounting said visor to a vehicle roof, wherein said panels include flexible means interconnecting adjacent panels.

9. The apparatus as defined in claim 8 wherein said flexible means comprise a ribbon woven between adjacent panels.

10. The apparatus as defined in claim 9 wherein said panels further include interconnecting guide means.

11. The apparatus as defined in claim 10 wherein said interconnecting guide means comprises troughs formed in each panel which align with and nest within troughs of adjacent panels.

12. The apparatus as defined in claim 7 wherein said visor is a windshield visor.

13. A visor system for a vehicle windshield comprising:
    a visor including a plurality of relatively thin generally horizontally extending panels mounted in sliding overlapping relationship to each other and means coupling said panels to each other for movement between a stored substantially overlapped position adjacent the vehicle roof to extended positions covering the vehicle window;
    means for mounting said visor to a vehicle roof; and a side panel pivotally mounted to opposite ends of one of said panels to fill in the corners of the vehicle windshield when the visor is fully extended.

14. The apparatus as defined in claim 13 and further including a guide plate for mounting to a vehicle roof and including a pair of arcuate slots formed therein and a guide pin extending from each of said side panels at an end opposite said pivotal connection to said one panel and extending into one of said slots to controllably pivot said side panels as said panels are extended and retracted.

15. The apparatus as defined in claim 7 wherein said mounting means comprises at least one channel means and a guide arm coupled to said visor and movably extended into said channel means.

16. The apparatus as defined in claim 15 wherein said mounting means includes a pair of spaced parallel channel means and a pair of spaced parallel guide arms aligned with and extending in said channel means.

17. The apparatus as defined in claim 16 wherein said guide arms are made of a flexible material.

18. A full coverage visor system for a vehicle window comprising:
   a visor including a plurality of panels arranged in sliding overlapping relationship to each other and flexible means coupling said panels to each other for movement between a stored substantially overlapped position adjacent the vehicle roof to an extended substantially non-overlapped position covering the vehicle window; and
   guide and support means for slideably mounting said visor to a vehicle roof.

19. The apparatus as defined in claim 18 wherein said panels extend substantially horizontally.

20. The apparatus as defined in claim 19 wherein said flexible means comprise a ribbon woven between adjacent panels.

21. The apparatus as defined in claim 20 wherein said panels include interconnecting guide means.

22. The apparatus as defined in claim 21 wherein said interconnecting guide means comprises notches formed in each panel which align with and nest within notches of adjacent panels.

23. The apparatus as defined in claim 18 wherein said visor is a windshield visor.

24. The apparatus as defined in claim 23 and further including a side panel pivotally mounted to opposite ends of one of said panels to fill in the corners of the vehicle windshield when the visor is fully extended.

25. The apparatus as defined in claim 18 wherein said guide and support means comprises at least one channel means and wherein said visor includes a guide arm moveably extended into said channel means.

26. The apparatus as defined in claim 25 wherein said guide and support means includes a pair of spaced parallel channel means and said visor includes a pair of spaced parallel guide arms.

27. The apparatus as defined in claim 26 wherein said guide arms are made of a flexible material.

28. The apparatus as defined in claim 24 and further including a guide plate for mounting to a vehicle roof and including a pair of arcuate slots formed therein and a guide pin extending from each of said side panels at an end opposite said pivotal connection to said one panel and extending into one of said slots to controllably pivot said side panels as said panels are extended and retracted.

29. The apparatus as defined in claim 18 wherein said panels are made of a thin flexible material.

30. The apparatus as defined in claim 29 wherein said panels are made of a carbon fiber composite material.

* * * * *

UNITED STATES PATENT AND TRADEMARK OFFICE
CERTIFICATE OF CORRECTION

PATENT NO. : 4,929,014

DATED : 5-29-90

INVENTOR(S) : Clark et al

It is certified that error appears in the above-identified patent and that said Letters Patent is hereby corrected as shown below:

Column 6, Claim 4, Line 18:
    After "proximate" delete "extended."

Column 6, Claim 4, Line 19:
    After "visor is" insert --extended."

Signed and Sealed this

Seventeenth Day of December, 1991

Attest:

HARRY F. MANBECK, JR.

*Attesting Officer*      *Commissioner of Patents and Trademarks*